United States Patent
Liu et al.

(10) Patent No.: US 9,867,083 B2
(45) Date of Patent: Jan. 9, 2018

(54) WIRELESS NETWORK CONTROLLER LOAD BALANCING

(71) Applicant: CISCO TECHNOLOGY, INC., San Jose, CA (US)

(72) Inventors: Hui Liu, San Jose, CA (US); Tak Ming Pang, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 411 days.

(21) Appl. No.: 14/255,393

(22) Filed: Apr. 17, 2014

(65) Prior Publication Data

US 2015/0304886 A1 Oct. 22, 2015

(51) Int. Cl.
*H04W 28/08* (2009.01)
*H04L 12/911* (2013.01)
*H04L 12/24* (2006.01)
*H04W 28/16* (2009.01)
*H04W 84/12* (2009.01)

(52) U.S. Cl.
CPC .......... *H04W 28/08* (2013.01); *H04L 41/12* (2013.01); *H04L 47/829* (2013.01); *H04W 28/16* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2007/0250713 A1* | 10/2007 | Rahman | H04L 63/162 713/171 |
| 2008/0285483 A1* | 11/2008 | Gil | H04L 41/04 370/254 |
| 2009/0003279 A1* | 1/2009 | Abusch-Magder | H04W 36/0083 370/331 |
| 2009/0109855 A1* | 4/2009 | Gong | H04W 16/10 370/238 |
| 2009/0175208 A1* | 7/2009 | Thubert | H04W 28/16 370/312 |
| 2009/0257380 A1* | 10/2009 | Meier | H04W 72/082 370/329 |
| 2011/0022676 A1* | 1/2011 | Thomson | H04W 8/12 709/208 |
| 2011/0151886 A1 | 6/2011 | Grayson et al. | |
| 2012/0087281 A1* | 4/2012 | Rahman | H04W 8/005 370/255 |
| 2012/0230491 A1* | 9/2012 | Duo | H04W 48/16 380/270 |
| 2013/0103795 A1* | 4/2013 | Kulkarni | H04L 67/125 709/217 |
| 2013/0189976 A1* | 7/2013 | Kim | H04W 72/0406 455/434 |

(Continued)

*Primary Examiner* — Shukri Taha
*Assistant Examiner* — Manuel Rangel
(74) *Attorney, Agent, or Firm* — Cindy Kaplan

(57) ABSTRACT

In one embodiment, a method includes selecting at a network device, seed access points from a plurality of access points and assigning each of the seed access points to a wireless network controller. The seed access points join the assigned wireless network controllers before the remaining access points join the wireless network controllers. Each of the remaining access points is associated with one of the seed access points and joins the same wireless network controller as the seed access point. An apparatus and logic are also disclosed herein.

17 Claims, 3 Drawing Sheets

(56) References Cited

U.S. PATENT DOCUMENTS

| | | | |
|---|---|---|---|
| 2013/0201863 A1 | 8/2013 | Chan et al. | |
| 2013/0232555 A1* | 9/2013 | Zhang | H04W 12/08 726/4 |
| 2013/0244669 A1* | 9/2013 | Das | H04W 24/02 455/446 |
| 2013/0331124 A1* | 12/2013 | Rieger, III | G01S 5/0252 455/456.1 |

* cited by examiner

WIRELESS NETWORK CONTROLLER LOAD BALANCING

TECHNICAL FIELD

The present disclosure relates generally to wireless networks, and more particularly, to wireless network controller load balancing.

BACKGROUND

Wireless local area networks (WLANs) typically include an access point (AP) and one or more client devices. Conventional networks typically rely on a wireless network controller to reject an AP if the controller is fully loaded.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
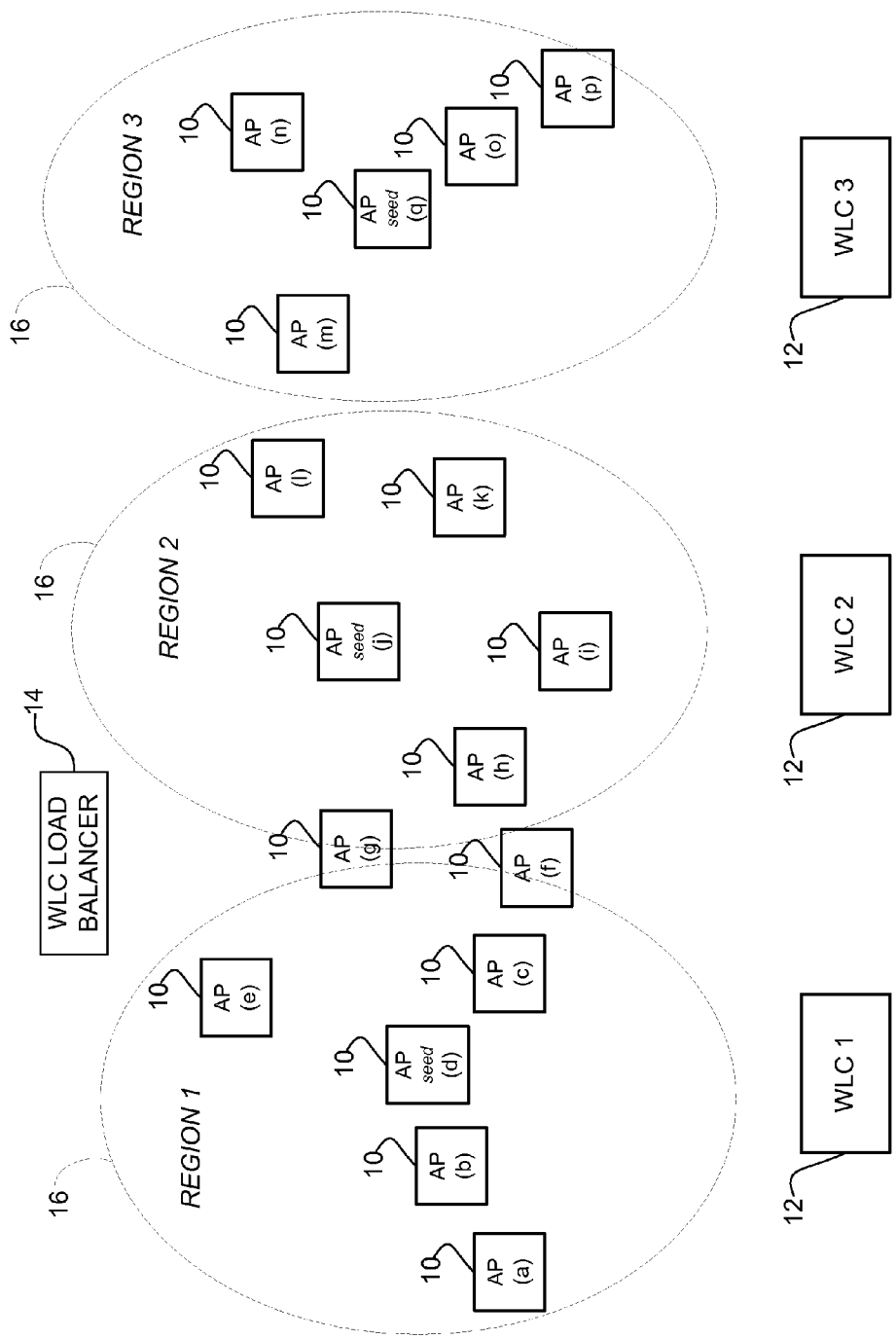
FIG. 1 illustrates an example of a network in which embodiments described herein may be implemented.

In one embodiment, a method generally comprises selecting at a network device, seed access points from a plurality of access points and assigning each of the seed access points to a wireless network controller. The seed access points join the assigned wireless network controllers before the remaining access points join the wireless network controllers. Each of the remaining access points is associated with one of the seed access points and joins the same wireless network controller as the seed access point.

In another embodiment, a method generally comprises receiving at an access point, neighbor messages from a plurality of access points comprising one or more seed access points, identifying at the access point, the seed access point in a same radio frequency region as the access point, and joining a wireless network controller assigned to the identified seed access point after the seed access point has joined the wireless network controller.

In another embodiment, an apparatus generally comprises a processor for selecting seed access points from a plurality of access points and assigning each of the seed access points to a wireless network controller. The apparatus further comprises memory for storing a list of neighbor access points. The seed access points join the assigned wireless network controllers before the remaining access points join the wireless network controllers. Each of the remaining access points is associated with one of the seed access points and joins the same wireless network controller as the seed access point.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Conventional wireless network controllers provide load information in discovery responses and reject an AP (Access Point) if the wireless network controller is fully loaded. The wireless network controller has no preference and cannot decide which AP joins first and does not consider existing AP neighbor relationships when allowing new APs to join.

The embodiments described herein provide large scale deployment RF (radio frequency) grouping based AP auto registration and wireless network controller load balancing. In certain embodiments, APs that represent physical regional centers (referred to herein as 'seed' APs) join designated wireless network controllers first, then their first order, second order, and third or more order AP neighbors can join the network gradually, so that APs with RF neighbor relationships are converged and grouped together on the same wireless network controller. The embodiments generally keep all of the controllers naturally balanced since the seed APs are representative of distinctive RF location centers. As described in detail below, APs bordering on two RF regions can join one of the wireless network controllers based on the seed APs precedence and controller load, for example. One or more embodiments provide dynamic wireless network controller load balancing, which solves the problem of configuring a large number of APs one by one for their preferred controller. Dynamic AP grouping based on RF neighbor relationships may improve RRM (Radio Resource Management) algorithm performance and efficiency. Certain embodiments may also reduce inter-controller roaming traffic/messaging and improve user mobility experience.

Referring now to the drawings, and first to FIG. 1, an example of a network in which embodiments described herein may be implemented is shown. For simplification, only a small number of network devices are shown. The network shown in FIG. 1 includes a plurality of access points (APs) 10 (a, b, c, d, e, f, g, h, i, j, k, l, m, n, o, p, q) in communication with three wireless network controllers (e.g., WLC (Wireless LAN (Local Area Network) Controller) 1, WLC 2, WLC 3). Any number or type of wireless devices (end stations, hosts, user devices, client devices) (not shown) may be in communication with the APs 10, including, for example, personal computers, laptops, mobile devices (e.g., phone, tablet, personal digital assistant), or any other wireless device. Each AP 10 may serve any number of client devices according to a wireless network communication protocol such as IEE 802.11, for example. The APs 10 may also be in communication with a wired network or wireless network (not shown) for communication with other networks. For simplification, wired or wireless links are not shown between devices.

The wireless network controller 12 may be in communication with one or more networks (e.g., Internet, intranet, local area network, wireless local area network, cellular network, metropolitan area network, wide area network, satellite network, radio access network, public switched network, virtual local area network, virtual private network, or any other network or combination thereof). Communication paths between the wireless network controller 12 and networks or between the controller and access points 10 may include any number or type of intermediate nodes (e.g., routers, switches, gateways, or other network devices), which facilitate passage of data between network devices.

The term 'wireless network controller' as used herein may refer to a wireless LAN controller, mobility controller, wireless control device, wireless control system, or any other network device operable to perform control functions for a wireless network. The network may also include a wireless control system or other platform for centralized wireless LAN planning, configuration, or management. The wireless network controller 12 enables system wide functions for wireless applications and may support any number of access points 10. The wireless network controller 12 may be, for example, a standalone device or a rack-mounted appliance. The wireless network controller 12 may also be a virtual device located in a network or cloud, for example.

In certain embodiments, the APs 10 are all in communication with a wireless network controller load balancer (e.g., WLC load balancer) 14 (also referred to as a manager or controller). The load balancer 14 may be located at one of the APs 10, one of the WLCs 12, or at another network device. The load balancer 14 may be a virtual element or distributed on two or more network devices. In one embodiment, the APs 10 are in direct communication with one another (e.g., wireless or wired communication) for communication with the load balancer 14 located at one of the APs. As described below, the APs 10 are also configured to transmit and receive neighbor messages to and from neighbor APs.

As shown in FIG. 1, each WLC 12 is associated with a region 16 (region 1, region 2, region 3). Each region 16 comprises one or more APs 10 associated with the WLC 12 in that region. The region 16 may be, for example, an RF region comprising a group of APs. In certain embodiments, the APs 10 are dynamically grouped based on their RF neighbor relationship so that they join the same WLC 12. In the example shown in FIG. 1, APs (a), (b), (c), (d), (e), and (f) are included in region 1, APs (g), (h), (i), (j), (k) and (l) are included in region 2, and APs (m), (n), (o), (p), and (q) are included in region 3. There may be any number of APs 10 located in each region.

As described below, a number of APs 10 may be selected as seed APs based on physical or planned RF regions. The term 'seed' as used herein refers to an AP within a region that is designated or selected as a central, first, or primary AP to represent that region. In certain embodiments, the seed AP 10 represents a physical regional center and at least one seed AP is deployed for each RF region 16. The number of seed APs is typically equal to the number of WLCs 12 to be deployed. In one or more embodiments, there may be subgroups within a region associated with a WLC 12, in which case there would be more than one seed AP associated with the WLC. The seed APs may be selected manually (e.g., by a network administrator) or automatically based on collected neighbor information (e.g., using an automated algorithm as described below).

Each seed AP 10 is assigned to a dedicated WLC 12 or backup WLC. The remaining (non-seed) APs preferably join the same WLC as their closest seed AP. Additional APs 10 are added to the region 16 only after the seed AP has joined the assigned WLC 12. The load balancing process described herein converges the network (graph) to a number of subgraphs (e.g., regions 16) after the joining process, with each subgraph having a cluster of APs physically close to each other that all join the same WLC 12. Each selected seed AP for each WLC is generally at the center of the subgraph. In the example shown in FIG. 1, AP (d) is selected as the seed AP for region 1, AP (j) is the seed AP for region 2, and AP (q) is the seed AP for region 3.

In one embodiment, a distance between the AP and seed AP is measured in degrees. For seed APs, their degree to the seed is set to zero. For first order neighbors of the seed APs, the degree is set to one, and so on. In region 1, APs (b), (c), and (e) are first order neighbors of seed AP (d), and AP (a) and AP (f) are second order neighbors. AP (h) is a third order neighbor to seed AP (d), however, it is a first order neighbor to AP (j), thus it would join WLC 2 (region 2).

APs that border two regions (e.g., AP (f) and AP (g)) can join either wireless network controller (e.g., WLC 1 or WLC 2) based on the seed AP's precedence, WLC load, or both. For example, with respect to AP (f), seed AP (d) may have a higher RSSI (Received Signal Strength Indicator) than seed AP (j), thus AP (f) may join the same WLC as seed AP (d). In this case, region 1 would have six APs (a, b, c, d, e, f) and region 2 would have only five APs (h, i, j, k, l). Thus, border AP (g) may join the same WLC as seed AP (j) based on WLC load.

As previously described, the seed AP 10 is allowed to join its assigned WLC 12 first, and then the remaining APs join the same WLC as their respective seed AP. The neighbor APs (e.g., first order, second order, third or more order) can join the network gradually, after the seed APs join the WLCs 12 so that APs with RF neighbor relationships are converged and grouped together on the same WLC. This keeps the WLCs naturally balanced since the seed APs are representative of distinctive RF location centers. This benefits, for example, an RRM (Radio Resource Management) algorithm that runs at the WLC level and reduces the roaming delay of wireless clients since most roaming clients will be intra-WLC APs.

In certain embodiments, neighbor messages are periodically transmitted (e.g., every sixty seconds or any other time interval) by APs 10. The APs 10 may forward this information to the controller 12 or load balancer 14. Each AP 10 may compile and maintain a list of neighboring APs and report them to the load balancer 14. The neighbor list is populated based on neighbor messages to identify first order APs, second order APs, etc. Neighbor messages may comprise a field for carrying information including, for example, WLC, WLC load, degree to the seed, or other information after the AP joins the WLC 12. The WLC 12 or load balancer 14 may also broadcast WLC load information to the APs 10. As described further below, the APs 10 that have not yet joined the network wait a sufficient amount of time to receive neighbor messages and collect neighbor information, and based on the ranking of degree to the seed AP, the AP selects the preferred WLC to join.

It is to be understood that the network shown in FIG. 1 and described above is only an example and that other networks having different network devices or topologies may be used, without departing from the scope of the embodiments.

Figure 2:
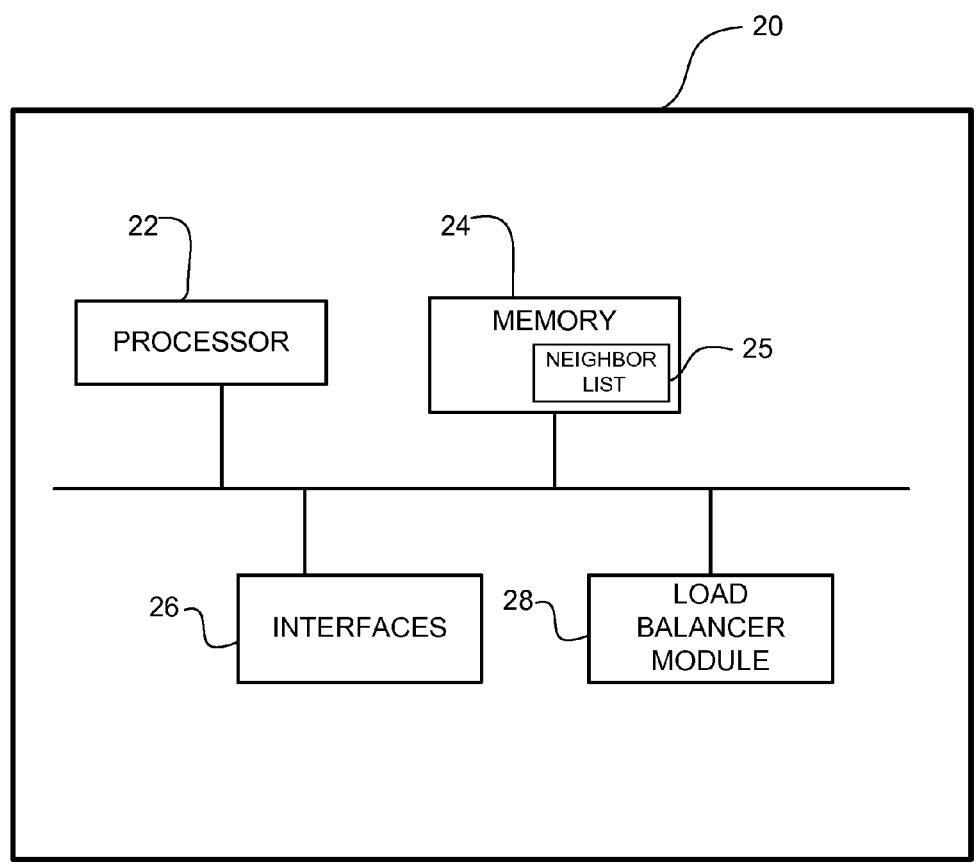
FIG. 2 depicts an example of a network device useful in implementing embodiments described herein.

FIG. 2 is a block diagram illustrating an example of a network device (e.g., AP, load balancer) 20 that may be used to implement embodiments described herein. In one embodiment, network device 20 is a programmable machine that may be implemented in hardware, software, or any combination thereof. The network device 20 includes a processor 22, memory 24, and interfaces 26. The network device 20 may also include a load balancer module 28.

Memory 24 may be a volatile memory or non-volatile storage, which stores various applications, modules, and data for execution and use by the processor 22. For example, memory 24 may include the load balancer module 28. The load balancer module 28 may comprise, for example, logic, code, or other mechanisms operable to perform the functions described herein. As discussed above, the load balancer module 28 may also be a distributed process. Memory 24 may also store a neighbor list 25.

Logic may be encoded in one or more tangible computer readable media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The interfaces 26 may comprise any number of interfaces (linecards, ports) for receiving data or transmitting data to other devices. For example, the interfaces may include an Ethernet interface for connection to a computer or network and a wireless interface (e.g., IEEE 802.11 WLAN interface).

It is to be understood that the network device 20 shown in FIG. 2 and described above is only an example and that network devices having different components and configurations may be used without departing from the scope of the embodiments. The network device 20 may further include any suitable combination of hardware, software, algorithms, processors, devices, components, or elements operable to facilitate the capabilities described herein.

Figure 3:
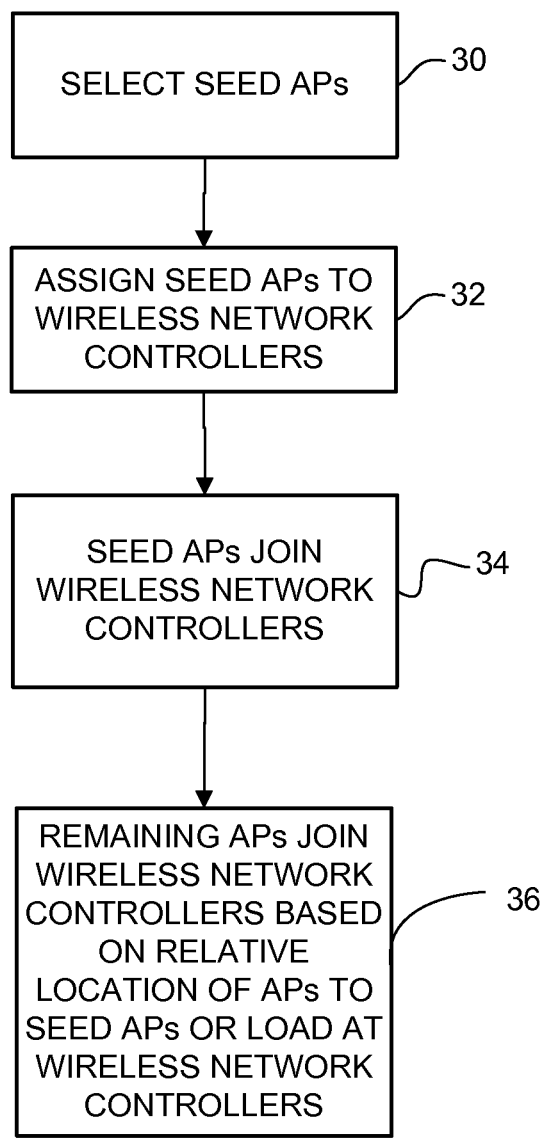
FIG. 3 is a flowchart illustrating a process for wireless network controller load balancing, in accordance with one embodiment.

FIG. 3 is a flowchart illustrating an overview of a process for wireless network controller load balancing, in accordance with one embodiment. In this example, the APs 10 are new (e.g., network initial deployment) and need to register to one of the WLCs 12. At step 30, a seed AP 10 is selected for each RF region 16. Based on the AP physical locations and RF planning, one seed AP may be automatically selected for each WLC 12 at a location. Each seed AP 10 is assigned to one of the wireless network controllers 12 (step 32). Seed AP selection and assignment of the seed APs 10 to wireless network controllers 12 may be performed at the load balancer 14, AP 10, WLC 12, or by a distributed process at the APs or other network devices, for example.

The seed APs 10 are powered up and join their designated WLCs 12 (step 34). The seed APs 10 join their respective assigned wireless network controllers 12 before the remaining (non-seed) access points join the wireless network controllers. The remaining APs are powered up and wait for a designated interval (e.g., 30 seconds or any other interval) for neighbor messages to be exchanged. After the delay, each of the remaining APs is associated with one of the seed access points and joins the same wireless network controller as the seed access point (step 36). As described below, the WLCs 12 for the remaining APs may be selected based on the seed AP with the highest RSSI or the WLC with the least load, for example.

It is to be understood that the process illustrated in FIG. 3 and described above is only an example and that steps may be modified, added, or combined, without departing from the scope of the embodiments.

The following describes examples of seed AP selection and WLC designation.

In certain embodiments, each network deployment has the AP location map and based on the number of WLCs in the network, a number of regions can be divided from the map and the AP located at the center of each region designated as the seed.

In certain embodiments, an automated algorithm is used to select seed APs. In one example, APs 10 are ranked by the number of qualified neighbors in their neighbor list (e.g., neighbor APs with RSSI above a threshold to define RF vicinity). The APs 10 that have a maximum number of neighbors are ranked higher. The list may be shortened for reducing calculation complexity. For example, APs 10 with a number of neighbors below a defined number N may not be considered as candidates for seed APs. The variable N may be derived based on the network density and RSSI threshold, for example.

In one embodiment, a neighbor differentiation ratio between the APs on the list is calculated. The differentiation ratio calculation may use a weighted sum by RSSIs. For example, if an RF neighbor is in a first AP's neighbor list, but not on a second AP's neighbor list (or vice versa), the RF neighbor is considered as one distinctive neighbor (DN) between the first and second APs. The higher the RSSI value of the DN, the higher weight that is given to this DN when calculating the ratio. These values are then summed up as the differentiation ratio between the APs that are being evaluated. If two APs are far away from each other, they will have less high RSSI neighbors in common.

The seed AP is selected to maximize the APs differentiation ratio with one another. This is to ensure that seed APs have more distinctive RF neighbor collections with each other and can be used to group the majority of APs onto different controllers based on the RF vicinity. The seed APs are designated to join different wireless network controllers, and as the seeds for their RF neighbors, to automatically register to different controllers. This results in a balanced distribution based on RF neighbor relationships.

It should be noted that when the differential ratio is used, it is generally assumed that the neighbor density (number of surrounding neighbors) of the two APs being compared is generally the same. Otherwise, if one of the APs has a larger number of DNs, it may have the same sum as the AP with a few high RSSI DNs.

The above process of selecting seed APs 10, allow the seed APs to represent separate locations and their neighbors to converge to join different wireless network controllers 12, thereby providing a natural load balancing among the controllers.

The following describes an example of a process for use in determining at a non-seed AP 10, which seed AP to associate with and join the same wireless network controller 12.

In one embodiment, neighbor APs are classified into different orders based on the RSSI (Received Signal Strength Indicator) of the neighbor messages. If the APs first order neighbor list contains a seed AP, it chooses to join the same WLC 12 as the seed AP. If there is a tie (e.g., more than one seed AP neighbor), the seed neighbor with the highest RSSI or the seed AP associated with the WLC with the smallest load is chosen. For example, the wireless network controller load may be taken into account when the AP 10 selects the controller 12 to join. If the AP 10 sees two WLCs 12 with the same degree to the seed APs, the less loaded WLC can then be chosen.

If the AP 10 has no seed AP as its first order neighbor, it may wait another cycle to see if it has any second order seed APs, and use the same algorithm to make a decision as to which WLC 12 to choose. Depending on the scale of the network, a maximum order may be defined so that if an AP 10 waits for a maximum number of intervals and still is not able to see any seed AP, it may choose to join the same WLC that its neighbor joined or pick a WLC with the smallest load.

In the case where the AP 10 cannot hear other APs, the AP can use the best available information to join a wireless network controller 12. For example, after a certain amount of time has passed and the AP still cannot hear any neighbor, the AP may use conventional wired controller discovery mechanisms (e.g., DHCP (Dynamic Host Configuration Protocol), DNS (Domain Name System), CAPWAP (Control and Provisioning of Wireless Access Points) discovery, etc.) to join an available wireless controller in the network.

If the network is already running and a new AP 10 is added, the new AP waits a specified period for sufficient neighbor information to be collected and then chooses one of the wireless network controllers 12 based on the relative RF distance to the closest seed, wireless network controller load, or both, as previously described.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   selecting at a network device, seed access points from a plurality of access points, each of the seed access points designated as a first access point to represent a physical regional center, the seed access points configured to join wireless network controllers before non-seed access points to maintain balance among the wireless network controllers; and
   assigning each of the seed access points to one of the wireless network controllers;
   wherein the seed access points join the assigned wireless network controllers before the remaining non-seed access points join the wireless network controllers, and wherein each of the remaining non-seed access points selects one of the seed access points to associate therewith and joins the same wireless network controller as the seed access point; and
   wherein at least one seed access point is selected for each radio frequency region based on an algorithm run to rank the access points based on a number of neighbor access points to provide load balancing among the controllers; and
   wherein the non-seed access points wait a designated interval and collect neighbor information before selecting one of the wireless network controllers to join based on the associated seed access point.

2. The method of claim 1 wherein each of the remaining access points are associated with one of the seed access points based on a relative radio frequency distance of the access point to the seed access point.

3. The method of claim 1 wherein running an algorithm comprises calculating a neighbor differentiation ratio for use in selecting the seed access points.

4. The method of claim 1 wherein neighbor messages are transmitted between access points and an order from the seed access point is determined based on an RSSI (Received Signal Strength Indicator), and wherein each of the access points is associated with the seed access point with the lowest order.

5. The method of claim 1 wherein one of the access points has more than one neighbor access point that is a seed access point and wherein the access point joins the same wireless network controller as the seed access point with the highest RSSI (Received Signal Strength Indicator).

6. The method of claim 1 wherein one of the access points has more than one neighbor access point that is a seed access point and wherein the access point joins the wireless network controller with the lowest load.

7. The method of claim 1 further comprising broadcasting a load for the wireless network controllers.

8. The method of claim 1 wherein a new access point is associated with one of the seed access points based on a relative radio frequency distance of the access point to the seed access point and a load at the wireless network controllers.

9. A method comprising:
   receiving at an access point, neighbor messages from a plurality of access points comprising a plurality of seed access points, each of the seed access points is assigned to a different wireless network controller;
   after waiting a specified period of time and collecting neighbor information, identifying at the access point, the seed access point in a same radio frequency region as the access point; and
   joining at the access point a wireless network controller assigned to the identified seed access point after the seed access point has joined the wireless network controller;
   wherein at least one seed access point is selected for the radio frequency region based on an algorithm run to rank the access points based on a number of neighbor access points;
   wherein each of the seed access points is designated as a first access point to represent a physical regional center, the seed access points configured to join wireless network controllers before non-seed access points to maintain balance among the wireless network controllers.

10. The method of claim 9 further comprising determining an order from the one or more seed access points based on an RSSI (Received Signal Strength Indicator), wherein identifying the seed access point comprises identifying the access point with a lowest order.

11. The method of claim 9 wherein the access point has more than one neighbor access point that is a seed access point and wherein the access point identifies the seed access point with the highest RSSI (Received Signal Strength Indicator).

12. The method of claim 9 wherein the access point has more than one neighbor access point that is a seed access point and wherein the access point joins the wireless network controller with the lowest load.

13. The method of claim 9 further comprising receiving load information for the wireless network controllers in the neighbor messages.

14. An apparatus comprising:
   a processor for selecting seed access points from a plurality of access points, and assigning each of the seed access points to a wireless network controller, each of the seed access points designated as a first access point to represent a physical regional center, the seed access points configured to join the wireless network controllers before non-seed access points to maintain balance among the wireless network controllers; and
   memory for storing a list of neighbor access points;

wherein the seed access points join the assigned wireless network controllers before the remaining non-seed access points join the wireless network controllers, and wherein each of the remaining non-seed access points selects one of the seed access points to associate therewith and joins the same wireless network controller as the seed access point; and wherein at least one seed access point is selected for each radio frequency region based on an algorithm run to rank the access points based on a number of neighbor access points to provide load balancing among the controllers; and wherein the non-seed access points wait a designated interval and collect neighbor information before selecting one of the wireless network controllers to join based on the associated seed access point.

15. The apparatus of claim 14 wherein each of the remaining access points are associated with one of the seed access points based on a relative radio frequency distance of the access point to the seed access point.

16. The apparatus of claim 14 wherein the processor is further operable to calculate a neighbor differentiation ratio for use in selecting the seed access points.

17. The apparatus of claim 14 wherein neighbor messages are transmitted between access points and an order from the seed access point is determined based on an RSSI (Received Signal Strength Indicator), and wherein each of the access points is associated with the seed access point with the lowest order.

* * * * *